Nov. 10, 1925.
S. BARDY
1,560,964
SCREEN FOR MOTION PICTURES
Filed April 14, 1922   2 Sheets-Sheet 1
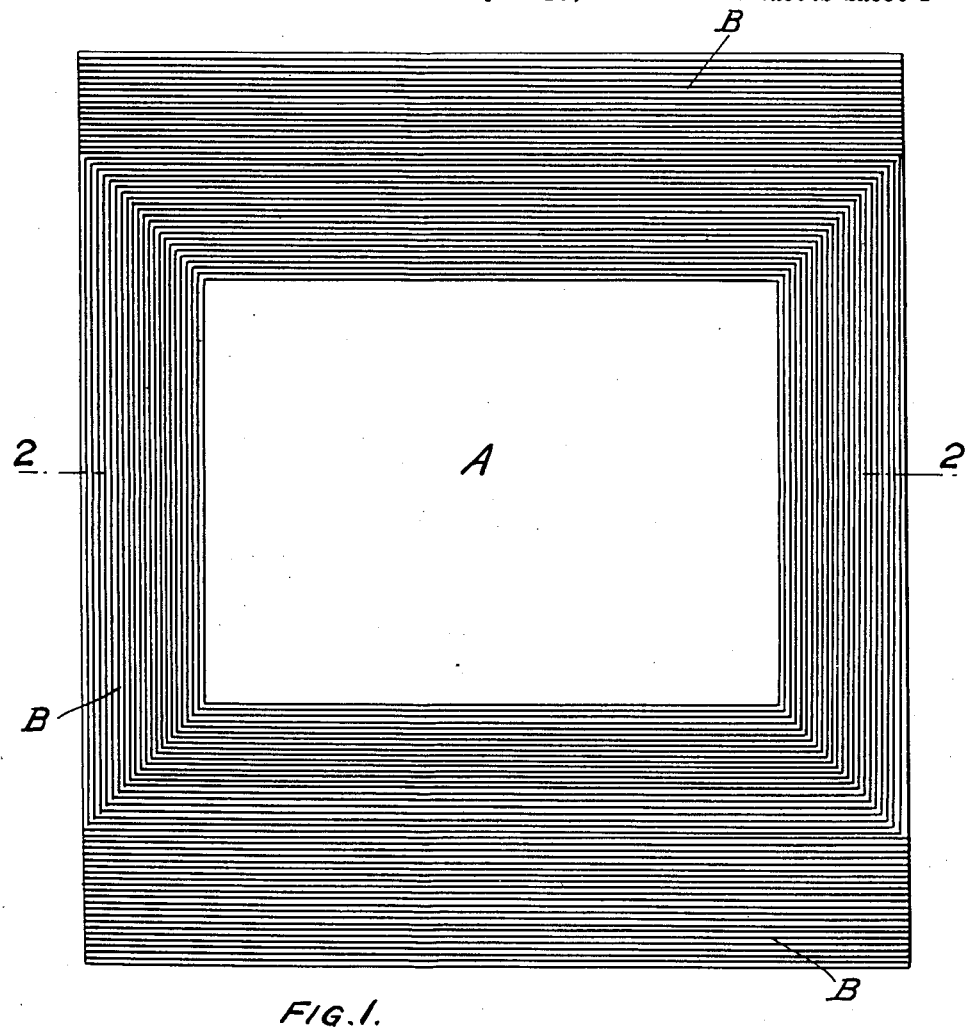
FIG./.
FIG. 2.
WITNESS:
INVENTOR
Samuel Bardy
BY
Frank S. Busser
ATTORNEY.

Nov. 10, 1925.

S. BARDY 1,560,964

SCREEN FOR MOTION PICTURES

Filed April 14, 1922    2 Sheets-Sheet 2

WITNESS:

INVENTOR
Samuel Bardy
BY
Frank S. Busser
ATTORNEY.

Patented Nov. 10, 1925.

1,560,964

UNITED STATES PATENT OFFICE.

SAMUEL BARDY, OF PHILADELPHIA, PENNSYLVANIA, ASSIGNOR, BY MESNE ASSIGNMENTS, TO BARDY PROJECTOR CO., OF PHILADELPHIA, PENNSYLVANIA, A CORPORATION OF DELAWARE.

SCREEN FOR MOTION PICTURES.

Application filed April 14, 1922. Serial No. 552,476.

*To all whom it may concern:*

Be it known that I, SAMUEL BARDY, a citizen of the United States, residing at Philadelphia, county of Philadelphia, and State of Pennsylvania, have invented a new and useful Improvement in Screens for Motion Pictures, of which the following is a full, clear, and exact description, reference being had to the accompanying drawings, which form a part of this specification.

This invention relates to screens for moving picture theatres onto which the pictures are projected by means of a projecting machine, and is more particularly adapted for use in connection with machines of the blending type in which the film is moved continuously.

The object of this invention is to provide a screen which is arranged to obliterate all of the rays of light projected on the border of the screen or that portion of the screen bounding the metal coated or reflecting portion on which the picture is exhibited, so that the rays of light which are to be exhibited stand out clear and sharp on the reflecting surface within the dark border.

This is accomplished by providing the border with angular surfaces so positioned relative to each other that if said surfaces are glossy they will reflect any light rays projected thereon by projecting machine, so that rays will not be perceived by the eyes of observers.

The precise nature of my invention will be best understood by reference to the accompanying drawings, which will now be described, it being premised, however, that changes may be made in the details of construction without departing from the spirit and scope of my invention as defined in the appended claims.

Fig. 1 of the drawings is a face view of one form of screen made in accordance with my invention.

Fig. 2 is a sectional view on the line 2—2 of Fig. 1.

Figures 3, 4, 5:
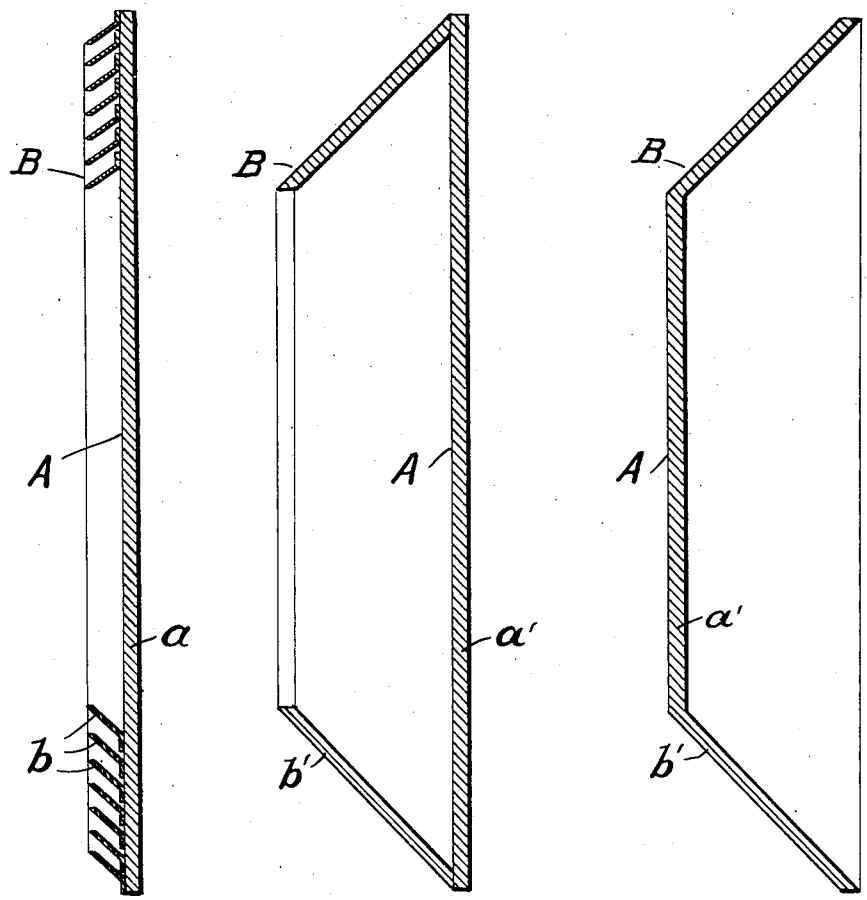
Figs. 3, 4 and 5 are similar views of other forms.

The screen illustrated in Figs. 1 and 2 comprises a central exhibiting portion A surrounded by a border portion B. The central portion A has substantially a plane surface, while the border is provided with surfaces at an angle to each other and to the central portion and preferably of saw tooth form in cross-section, as clearly shown in Fig. 2.

The portion A is coated or finished in such a manner as to clearly show the picture projected thereon, while the border is coated with a dark, preferably black, glossy coating, having sufficient gloss to reflect the light rays projected thereon.

In a device constructed in accordance with Figs. 1 and 2 which was put into use, the portion A was coated with an aluminium paint, while the portion B was provided with a black coating with a high gloss. The picture which was thrown upon the screen was larger than the central portion A. That portion of the picture thrown on the central portion A stood out clear and sharp due to the high light on said portion and the black border, while the portions of the picture projected on the border portion B were not observed by the eye, as these light rays were reflected in such a manner that they were not observed by the eye.

In the form shown in Fig. 3, the border B is formed of a plurality of spaced sheet metal strips $b$ secured to a backing $a$, and in which the strips along each edge of the central reflecting portion A are substantially parallel to each other.

The form shown in Fig. 4 comprises a backing $a'$ on which are mounted relatively wide angular strips $b'$ and which extend in front of the central reflecting portion A.

The form shown in Fig. 5 is similar to that shown in Fig. 4, but in this form the angular strips $b'$ extend rearwardly and outwardly from the reflecting surface A.

The advantages of my invention result from the provision of a screen for exhibiting moving pictures having a central portion for exhibiting the picture and a dark border provided with reflecting surfaces so arranged as to prevent the light rays projected thereon from reaching the eye of the observer.

Having now fully described my invention, what I claim and desire to protect by Letters Patent is:

1. A screen of the character described having an exhibiting surface, and a glossy reflecting border surrounding said surface, the surface of the border being at a sufficiently great angle to the exhibiting surface to deflect the rays of light directed on the border away from the eyes of the observer.

2. A screen of the character described having an exhibiting surface, and a black glossy reflecting border surrounding said surface, the surface of the border being at a sufficiently great angle to the exhibiting surface to deflect the rays of light directed on the border away from the eyes of the observer.

3. A screen of the character described having a central exhibiting surface, a border having reflecting surfaces of saw tooth cross section surrounding said exhibiting surface, the angle of the faces of the teeth being such as to deflect the rays of light directed to the border away from the eyes of the observer.

In testimony of which invention, I have hereunto set my hand, at Philadelphia, Pa., on this 4th day of April, 1922.

SAMUEL BARDY.